United States Patent
Balzer

(10) Patent No.: US 11,468,021 B2
(45) Date of Patent: Oct. 11, 2022

(54) METHOD FOR THE DEPLOYMENT OF SCHEMA CHANGES IN SYSTEMS INVOLVING A DATABASE AND COMPUTER SYSTEM

(71) Applicant: SIEMENS AKTIENGESELLSCHAFT, Munich (DE)

(72) Inventor: Peter Balzer, Avegno (IT)

(73) Assignee: Siemens Aktiengesellschaft, Munich (DE)

( * ) Notice: Subject to any disclaimer, the term of this patent is extended or adjusted under 35 U.S.C. 154(b) by 149 days.

(21) Appl. No.: 16/257,405

(22) Filed: Jan. 25, 2019

(65) Prior Publication Data

US 2019/0227997 A1    Jul. 25, 2019

(30) Foreign Application Priority Data

Jan. 25, 2018 (EP) .................................. 18153436

(51) Int. Cl.
| | |
|---|---|
| *G06F 16/21* | (2019.01) |
| *G06F 16/242* | (2019.01) |
| *G06F 16/22* | (2019.01) |
| *G06F 16/25* | (2019.01) |

(52) U.S. Cl.
CPC .......... *G06F 16/211* (2019.01); *G06F 16/213* (2019.01); *G06F 16/214* (2019.01); *G06F 16/2282* (2019.01); *G06F 16/2445* (2019.01); *G06F 16/256* (2019.01)

(58) Field of Classification Search
CPC ............... G06F 16/211; G06F 16/2282; G06F 16/2445; G06F 16/256; G06F 16/214; G06F 16/213

USPC ......................................................... 707/803
See application file for complete search history.

(56) References Cited

U.S. PATENT DOCUMENTS

| | | | | |
|---|---|---|---|---|
| 2003/0033494 | A1* | 2/2003 | Fujibayashi | G06F 3/0647 |
| | | | | 711/162 |
| 2008/0228908 | A1* | 9/2008 | Link | H04L 41/0853 |
| | | | | 709/223 |
| 2012/0265972 | A1* | 10/2012 | Zwartenkot | G06F 8/4434 |
| | | | | 712/226 |
| 2017/0017669 | A1 | 1/2017 | Eberlein et al. | |
| 2017/0243130 | A1* | 8/2017 | Kephart | G06F 16/24575 |

(Continued)

OTHER PUBLICATIONS

De Jong, Michael, et al.: "Continuous Deployment and Schema Evolution in SQL Databases", 2015 IEEE/ACM 3rd International Workshop on Release Engineering, IEEE, pp. 16-19. (Year: 2015).*

(Continued)

*Primary Examiner* — Allen S Lin
(74) *Attorney, Agent, or Firm* — Laurence A. Greenberg; Werner H. Stemer; Ralph E. Locher

(57) ABSTRACT

A method and a corresponding system for deploying changes in a computer system, in particular an industrial computer system, includes a database and an old version of the system to be updated. The method includes providing a new version of the system and providing a merge view capable of reading data from the database and furnishing the data to the new version. The database contains at least an old table readable by the old version and the merge view can read data from the old table and furnish them to the new version.

7 Claims, 3 Drawing Sheets

(56) References Cited

U.S. PATENT DOCUMENTS

2018/0307546 A1\* 10/2018 Aston .................... G06F 9/542
2019/0129997 A1\* 5/2019 Auer ...................... G06F 16/25

OTHER PUBLICATIONS

De Jong, Michael, et al.: "Zero-downtime SQL database schema evolution for continuous deployment", Software Engineering, IEEE Press, 445 Hoes Lane, PO Box 1331, Piscataway, NJ 08855-1331 USA, pp. 143-152, University of Namur, Belgium.
De Jong, Michael, et al.: "Continuous Deployment and Schema Evolution in SQL Databases", 2015 IEEE/ACM 3rd International Workshop on Release Engineering, IEEE, pp. 16-19.

\* cited by examiner

METHOD FOR THE DEPLOYMENT OF SCHEMA CHANGES IN SYSTEMS INVOLVING A DATABASE AND COMPUTER SYSTEM

CROSS-REFERENCE TO RELATED APPLICATION

This application claims the priority, under 35 U.S.C. § 119, of European Patent Application EP 18 153 436.3, filed Jan. 25, 2018; the prior application is herewith incorporated by reference in its entirety.

BACKGROUND OF THE INVENTION

Field of the Invention

The invention relates to a method for deploying changes in computer systems, in particular changes involving modifications in the structure of a database. The invention also relates to a computer system.

Interesting, yet not limiting, examples of industrial software to which the present invention can be applied are Manufacturing Execution System (MES) and Manufacturing Operation Management (MOM). Most recently, the term MOM is more and more used to replace the term MES. Those systems can usually include software used as a component or acting as a component in the sense above explained.

As defined by the Manufacturing Enterprise Solutions Association (MESA International), a MES/MOM system "is a dynamic information system that drives effective execution of manufacturing operations," by managing "production operations from point of order release into manufacturing to point of product delivery into finished goods" and by providing "mission critical information about production activities to others across the organization and supply chain through bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens AG offers a broad range of MES/MOM products under its SIMATIC® IT product family.

In any event, as mentioned above, MES/MOM systems are only an example of industrial software to which the invention applies, but which is suitable for any kind of application packages relying on dedicated databases.

With reference to FIG. 1, when systems are constructed according to REST (REpresentational State Transfer) guidelines, which implies, in particular, that all information regarding the state of the system is stored in a database, all changes to the applications and even operative systems, not involving modifications to a database 1, can simply be deployed by providing new applications 2, platforms 3, and/or operative systems 4 on a dedicated new machine or set of machines 5 (which can also simply be virtual machines). A load balancer 6 can direct any request from the user to the new set of machines, immediately as soon as the changes are created.

If there should be a problem with the new machines, one can simply switch back to old machines 5' in an operation known as rollback.

Possible changes that can be thus performed are operative system (OS) patches or even major updates, updates to the external or internal platforms and updates to the apps such as user interfaces (UI) and business logic.

However, nowadays requirements of continuous development, and iterative approach even to modelling, imply that changes to the internal database schema are frequently necessary.

By simply applying changes to the database schema, compatibility with the old business logic is lost, as well as the opportunity for a safe rollback. Moreover, a database can include millions of items of data that can be involved and must be migrated from old tables to new tables. Since, during such an operation, the database cannot be accessed by the applications, that would lead to unacceptably prolonged downtimes (of even many hours).

In order to maintain the possibility to rollback, only changes to the database schema compatible to the old business logic can be performed, and the new business logic must be written accordingly, thus many possible changes are excluded, such as renaming or deleting columns, or changing data types, making agile-style refactorings practically impossible. Those limitations do not avoid the necessity to write very complex code, just for preserving compatibility.

On the other hand, renouncing the possibility of a rollback, relying on quick fixing of problems is risky, and can be unacceptable.

SUMMARY OF THE INVENTION

It is accordingly an object of the invention to provide a method for the deployment of schema changes in systems involving a database and a computer system, which overcome the hereinafore-mentioned disadvantages of the heretofore-known methods and systems of this general type.

With the foregoing and other objects in view there is provided, in accordance with the invention, a method for deploying changes in a computer system, in particular an industrial computer system, in which the system includes a database and an old version of the system to be updated, the method comprising:
 providing a new version of the system;
 providing a merge view capable of reading data from the database and furnishing the data to the new version;
 wherein the database contains data in old tables readable by the old version and the merge view can read the old tables and furnish the data to the new version.

According to a preferred embodiment of the invention, the method includes writing data in the database both by the new and the old version, where the old version continues to write into the old tables and the new version writes into new tables readable by the new version.

Thus, the new version is enabled to operate as well as if the data in the database were all in new tables, data available entered before deployment of the new version, only present in the old tables, can be seen by the new version through the merge view, and the old version can read the old tables and is still able to fully operate.

The term table is intended as in the common language of relational databases, as well as other terms such as schema and record.

The method preferably further includes the migration of data from old tables compliant to the old version into new tables compliant to the new version.

With the objects of the invention in view, there is also provided a computer system, comprising an old and a new version, a database including at least data in at least one old table readable by the old version, and a merge view capable of reading data from the database in old tables and furnishing the data to the new version.

Preferably, the merge view can also read data from at least one new table readable by the new version.

The term "system version" is intended to mean a complex of applications, platforms and operating systems capable of performing the functions of the system. The old and new version can preferably run on different machines (which can also mean different virtual machines on the same physical machine) so as to be able to run independently.

Other features which are considered as characteristic for the invention are set forth in the appended claims.

Although the invention is illustrated and described herein as embodied in a method for the deployment of schema changes in systems involving a database and a computer system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
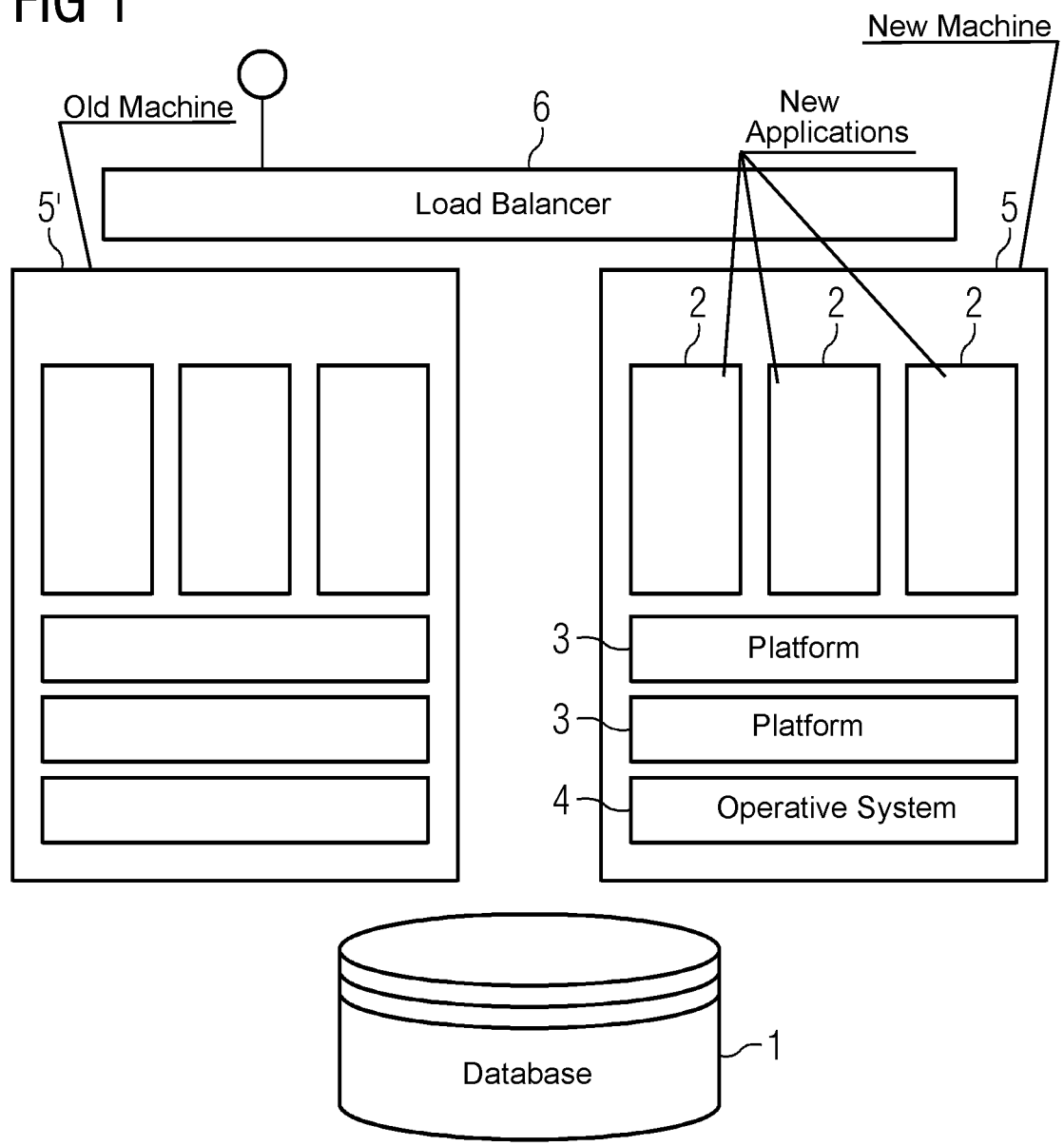
FIG. 1 is a schematic flow diagram of a method according to the state of the art as discussed above, wherein no changes to a database are foreseen.
Figure 2:
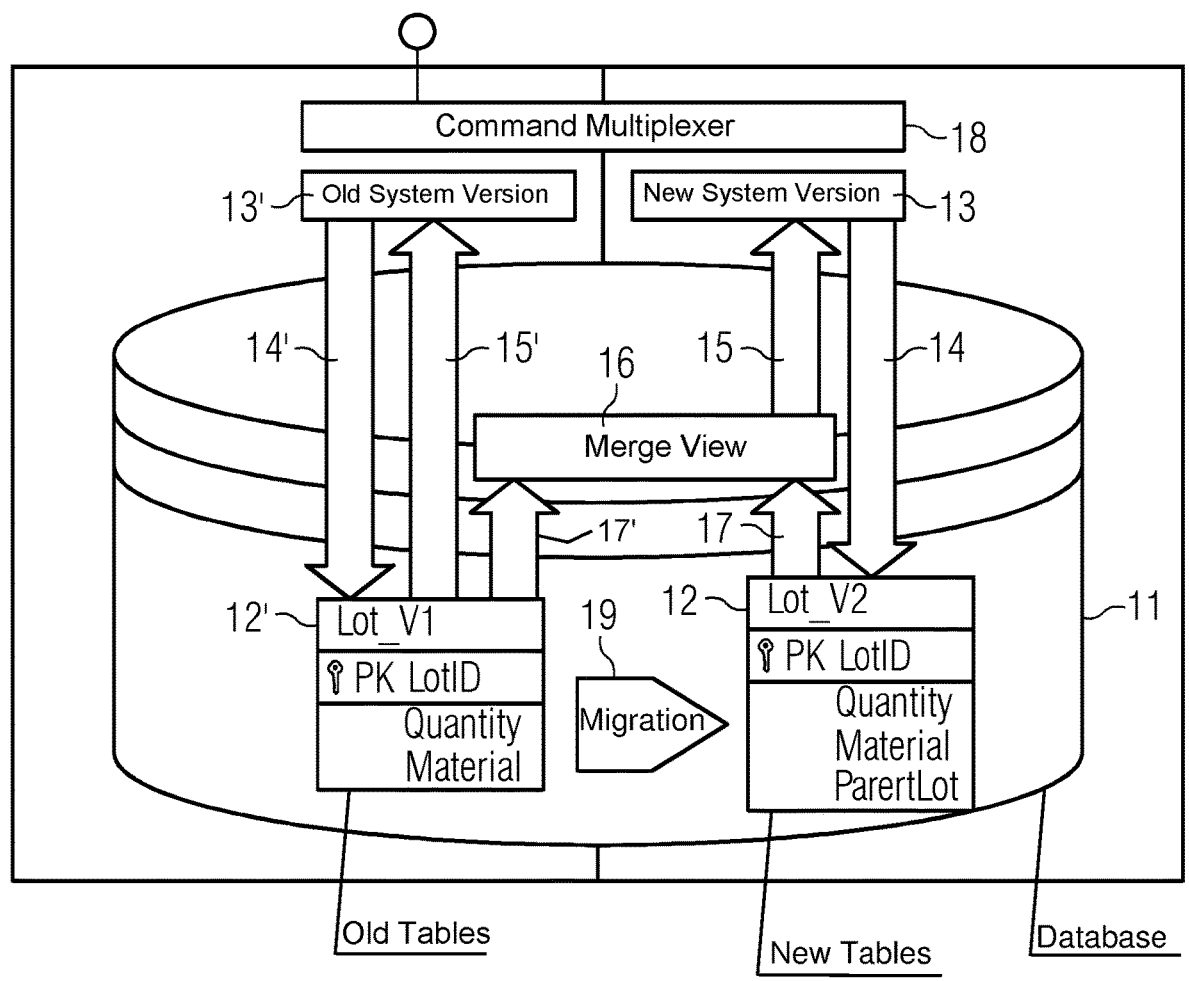
FIG. 2 is a schematic flow diagram of a method according to the invention.

Referring now to the figures of the drawings in detail and first, particularly, to FIG. 2 thereof, there is seen a system including a database 11 having new tables 12 and old tables 12' containing the data. The system includes an old system version 13' and a new system version 13.

The old version can write 14' and read 15' the old tables 12'. Similarly, the new version can write 14 and read 15 the new tables 12. However, according to the method, a merge view 16 at least reads 17' the old data and 17 the new data and can furnish them to the new version 13 so that the latter can read 15 those data as if they were from a table compliant to the new version, even if some data may only be retrieved by the merge view 16 since they are only available in tables compliant to the old version, or, in case the new version requires another kind of data they may be inserted as fixed values or empty strings, for example, until they are updated.

A command multiplexer 18 can, upon operation requests, operate both versions to write the database, so that the old tables are always up to date and the old version can operate regardless according to the operation of the new version. The latter operates through the merge view.

Since all data is available in the old table, rollback can be easily done by deactivating the new version and merge view and, if necessary, deleting the new tables.

The old tables are modified only by the old version, and therefore there is no risk that they are corrupted by the new version. Rollback is immediate and no data is lost.

The method preferably further includes a migration 19 of data from old tables into new by a suitable program. This can happen by copying the data or calculating them from the old tables and writing them into the new tables. Preferably, once a data item is migrated (or, e.g. all of the data relating to an item), it is marked so that the merge view does not retrieve it any more from the old tables. This can happen, e.g. by adding a column, not readable by the old version, but only by the merge view, in the old tables, with the column containing the status information.

Since both versions are operative at any time, relying on old or new tables, the migration operation can be performed in small steps, whereby only a predetermined quantity of data are migrated at a time. The steps are alternated with normal operation of the system, which is indeed slowed, but is not necessarily subject to downtimes with unavailability to the users. The migration steps can then be programmed according to logics capable of minimizing drawbacks and allowing a convenient compromise between availability and updating speed of the system (which can undergo further changes only after migration is complete). Once the migration operation is completed and the new version has been found reliable, the old version can be dismissed, and old tables can be deleted.

Figure 3:
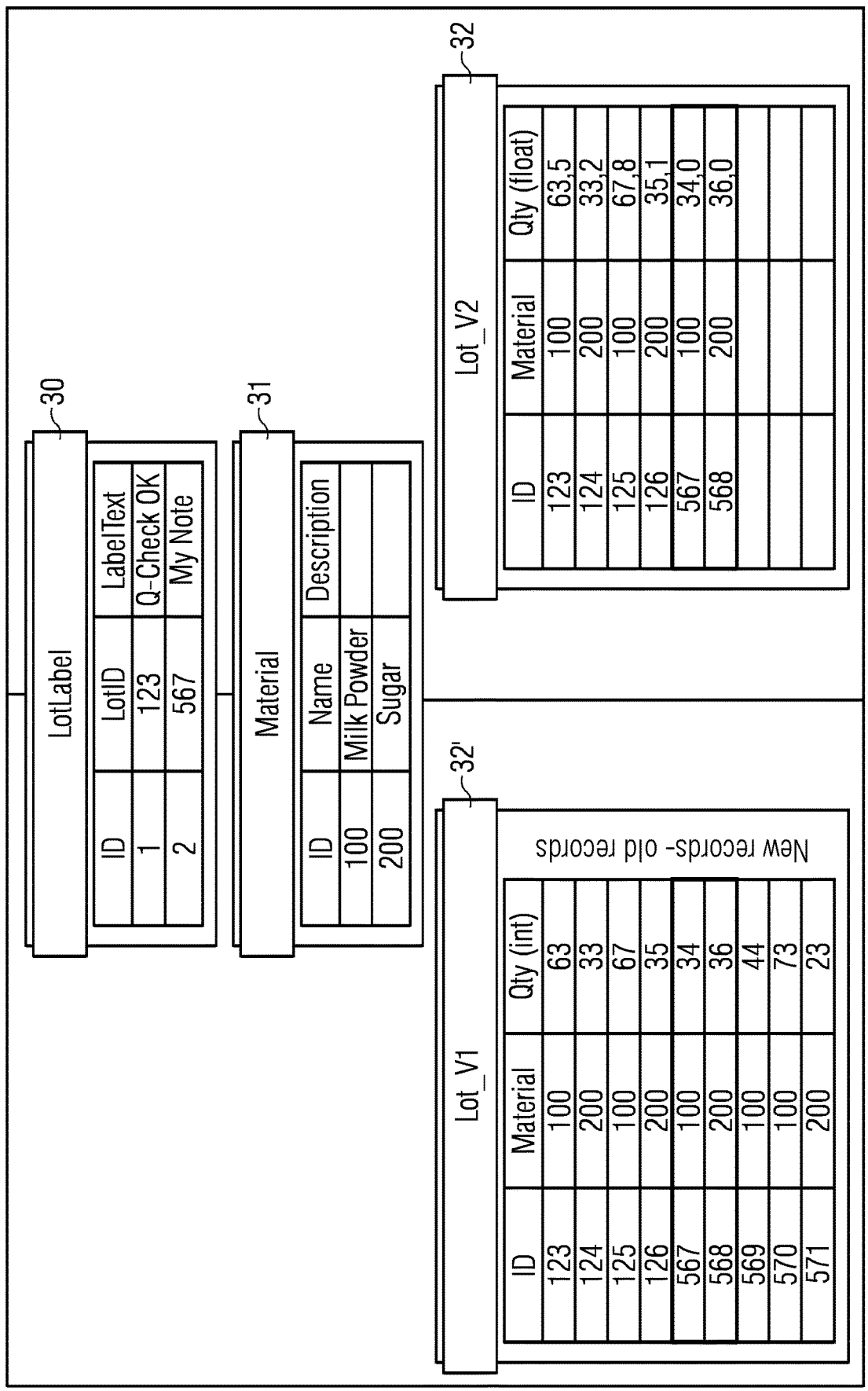
FIG. 3 is a schematic illustration of the structure of table according to an old and a new version of a database.

Referring to FIG. 3, the database can contain unchanged tables 30, 31 having a schema which has not changed, but can have a relationship to other new tables 32 or old tables 32'. Those can be read by both versions, as well as the merge view.

It is preferred that the same records (to which a series of data are associated) maintain the same ID in both tables. Otherwise, if the database structure does not allow it, for instance a further table acting as a cross reference can be provided, readable by the merge view, to allow a cross reference.

The following is a summary list of reference numerals and the corresponding structure used in the above description of the invention.

LIST OF REFERENCE SIGNS

1 Database
2 Applications
3 Platforms
4 Operative system
5 New machines
5' Old machines
6 Load balancer
11 Database
12 New table
12' Old table
13 New system version
13' Old system version
14, 14' Writing operation
15, 15', 17, 17' Reading operations
18 Command multiplexer
19 Migrating operation
30, 31 Unchanged tables
32 New table
32' Old table

The invention claimed is:
1. A computer system including at least one physical machine, the computer system comprising:

an old version of software to be updated running on the at least one physical machine;

a new version of the software running on the same at least one physical machine;

a database including data in at least one old table having a first format readable by said old version of software to be updated;

said new version of the software running independently of said old version, such that said old version continues to write into said at least one old table in said first format and said new version writes into at least one new table of said database in a second format readable by said new version, said first format being different from said second format, and both of said old version and said new version being operative at any time;

a merge view configured to read said data from said database and furnish said data to said new version in said second format readable by said new version as if said data read from said at least one old table was read from said at least one new table to said new version;

said merge view configured to read said data from said at least one old table and write said data to said at least one new table to said new version; and a command multiplexer configured to operate said old version and said new version, to write said data to said at least one old table of said old version, so that said at least one old table is always up to date, and to write said data to said new version, said command multiplexer operating said new version through said merge view to write said data to said at least one new table with said new version;

a cross-reference table readable by said merge view for cross-referencing ID changes of said data;

the computer system migrating said data from said at least one old table compliant to said old version into said at least one new table compliant with said new version using said cross-reference table as a cross-reference; and the computer system marking said migrated data in said new version so that said merge view no longer reads them from said at least one old table compliant to said old version.

2. A method for deploying changes to the structure of a database in a computer system, the method comprising the following steps:

providing at least one physical machine including an old version of a system to be updated, the database containing at least one old table having a first format readable by the old version of the system to be updated;

providing a new version of the system to be updated on the same at least one physical machine, the new version running independently of the old version, such that the old version continues to write into the at least one old table in the first format and the new version writes into at least one new table of the database in a second format readable by the new version, the first format being different from the second format, both of the old version and the new version being operative at any time;

providing a merge view configured to read data from the database and furnish the data to the new version in the second format readable by the new version as if the data read from the at least one old table was read from the at least one new table compliant to the new version;

using the merge view to read the data from the at least one old table and write the data to the at least one new table compliant to the new version;

using a command multiplexer to operate the old version and the new version to write the data to the at least one old table of the old version, so that the at least one old table is always up to date, and to write the data to the new version, the command multiplexer operating the new version through the merge view;

providing a cross-reference table readable by the merge view for cross-referencing ID changes of the data;

migrating the data from the at least one old table compliant to the old version into the at least one new table compliant with the new version, the cross-reference table acting as a cross-reference; and marking the migrated data in the new version so that the merge view no longer reads them from the at least one old table compliant to the old version.

3. A computer system including at least one physical machine running an old version of a system to be updated and a new system version, the computer system including a computer processor configured to carry out the steps of claim 2.

4. The method according to claim 2 wherein the computer system is an industrial computer system.

5. The method according to claim 2 which further comprises using the merge view to read the data from the at least one new table and write the data to the new version.

6. The method according to claim 2 wherein the system is a Manufacturing Execution System or Manufacturing Operation Management application.

7. The method according to claim 2 which further comprises carrying out the migration operation to migrate the data in predetermined quantities, and altering the migration operation to a normal operation of the system.

* * * * *